(12) United States Patent
López Orbea et al.

(10) Patent No.: US 6,279,410 B1
(45) Date of Patent: Aug. 28, 2001

(54) TORQUE VARIATOR DEVICE CONSISTING ON ONE MECHANISM TO BE INTERLEAVED BETWEEN A CONDUCTOR TRANSMISSION ARBOR AND A CONDUCTED ARBOR

(76) Inventors: Cesar Raul López Orbea; Elsa Dora Luján Orbea De López, both of Chacabuco 96, 2° plso 1069 - Buenos Aires (AR)

( * ) Notice: Subject to any disclaimer, the term of this patent is extended or adjusted under 35 U.S.C. 154(b) by 0 days.

(21) Appl. No.: 09/501,877

(22) Filed: Feb. 10, 2000

(30) Foreign Application Priority Data

Feb. 11, 1999 (AR) .......................................... 99 01 00575

(51) Int. Cl.$^7$ .............................. F16H 21/12; G05G 1/04
(52) U.S. Cl. .................................................. 74/63; 74/518
(58) Field of Search ....................................... 74/63; 1/518

(56) References Cited

U.S. PATENT DOCUMENTS

| | | | |
|---|---|---|---|
| 3,750,485 | * 8/1973 | Blakemore | 74/63 X |
| 3,793,895 | * 2/1974 | Wright | 74/63 |
| 3,806,014 | * 4/1974 | Bolli | 74/63 X |
| 4,192,200 | * 3/1980 | McCoin | 74/191 X |
| 5,090,395 | * 2/1992 | Gannon | 124/25.6 |
| 5,996,432 | * 12/1999 | Orbea et al. | 74/63 |

* cited by examiner

Primary Examiner—Charles A Marmor
Assistant Examiner—Roger Pang
(74) Attorney, Agent, or Firm—Pendorf & Cutliff

(57) ABSTRACT

The torque variator device of the invention is a mechanism to be interleaved between a transmission arbor and a conducted arbor, and it includes two circular plates that at the external edges they have double serrated rings. On one hand, said rings include the serration of a peripheric ratchet, and, on the other hand they engage with corresponding conical pinions at the end of the threaded bars, located radially and which are gyratory within a threaded hole in radially displaceable coupling elements of said circular plates.

The invention also includes a device for the detection of the radial location of said coupling elements.

3 Claims, 5 Drawing Sheets

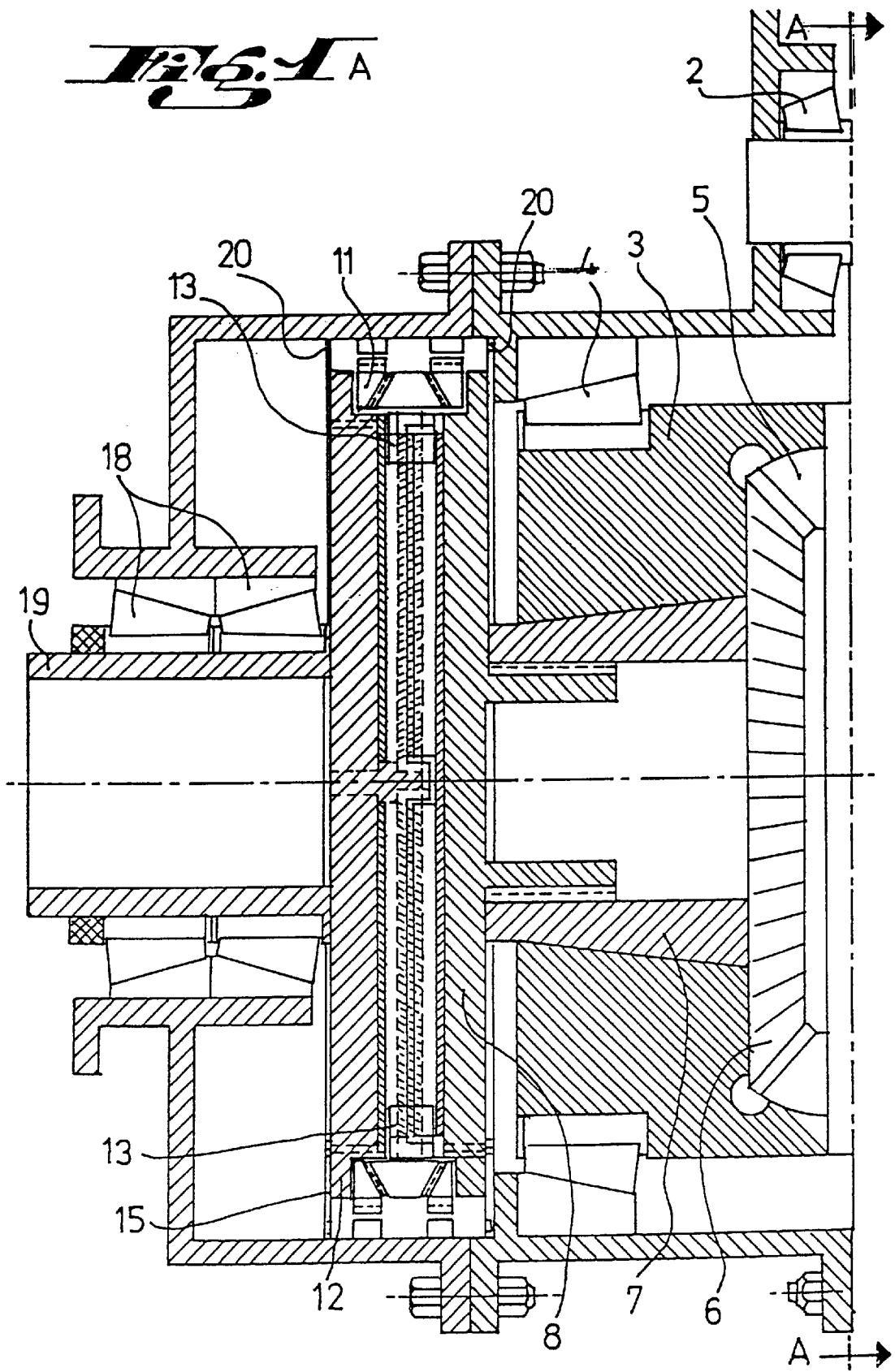

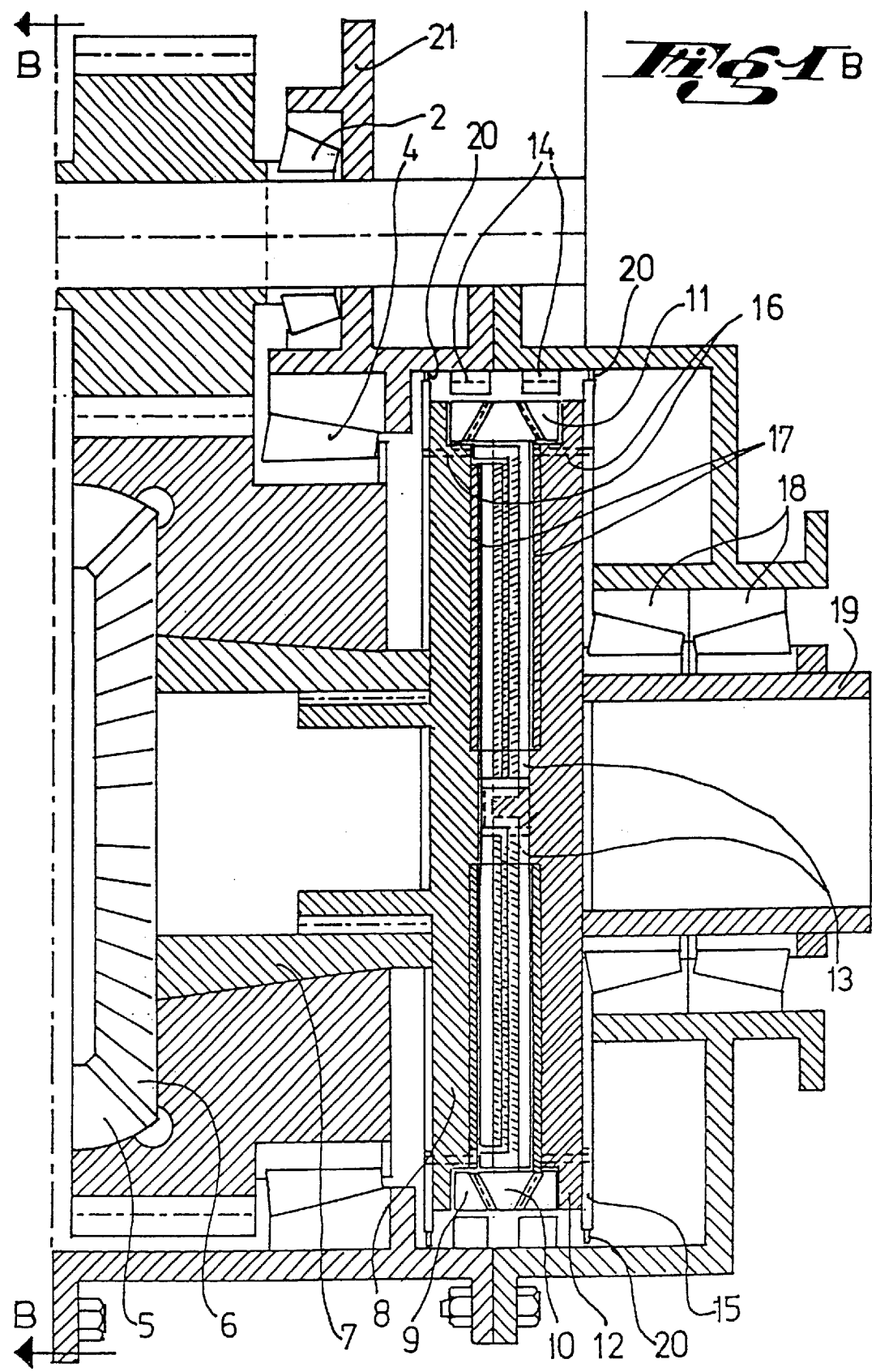

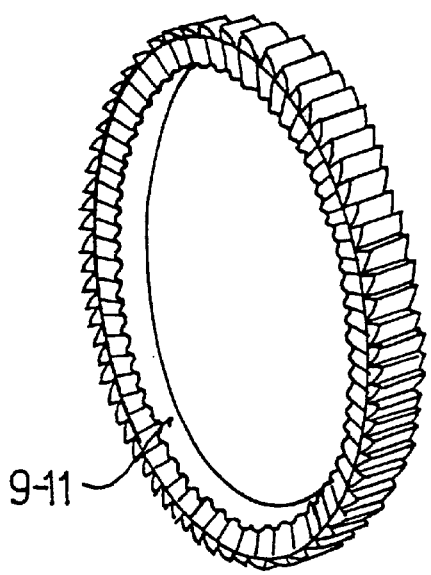
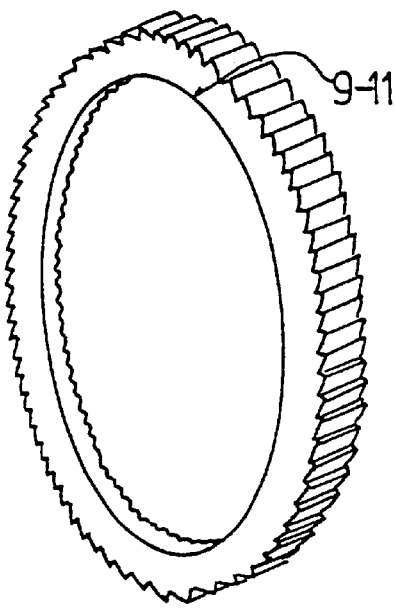
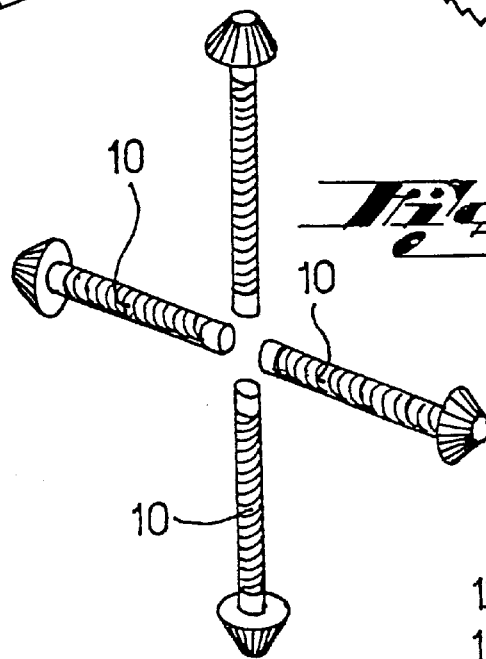
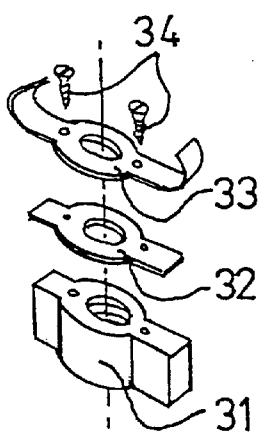
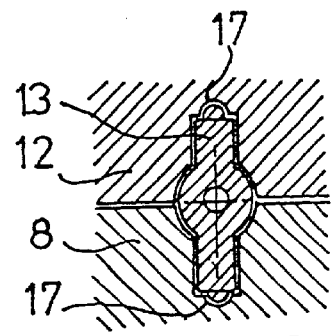

US 6,279,410 B1

TORQUE VARIATOR DEVICE CONSISTING ON ONE MECHANISM TO BE INTERLEAVED BETWEEN A CONDUCTOR TRANSMISSION ARBOR AND A CONDUCTED ARBOR

I—BACKGROUND OF THE INVENTION

The present invention refers to a torque variator device and, more precisely to a device to be used in a transmission shaft in order to modify the torque between a conductor end and a conducted end of said shaft.

A specific application of said device is seen at the outlets of the differential mechanism in vehicles in order to increase or decrease the torque exerted on the driving wheels depending on the characteristics of the ground on which the vehicle is circulating.

The main advantage of the device of the present invention is the simplicity of its mechanism, which leads to an easier construction and a low cost in the manufacturing of said device.

II—SUMMARY OF THE INVENTION

The main object of the present invention is a torque variator device consisting of a mechanism to be interleaved between a transmission arbor and a conducted arbor. Its novelty consists in that it includes two circular plates that drag, each one, double serrated rings. On one hand, said rings include the serration of a peripheric ratchet, and, on the other hand they engage with corresponding conical pinions solidary with the threaded bars, located radially and which are gyratory within coupling elements radially displaceable of said circular plates.

A preferred embodiment of the invention also includes means for the detection of the location of said coupling displaceable elements.

In said preferred embodiment of the invention, said circular plates are connected, one to the conductor arbor and the other to the conducted arbor, said rings being equally doubly serrated and located in a bench at the periphery of said plates.

III—BRIEF DESCRIPTION OF THE DRAWINGS

The advantages and the main object of the device of the invention will be considered in the following description of a preferred embodiment, with reference to the drawings, wherein, FIGS. 1A and 1B are sections of the set of the mechanism of the device of the invention applied to a differential.

FIGS. 4 and 5 are views in perspective of both sides of the doubly threaded ring.

FIG. 6 is a view in perspective of the four threaded bars with the conical engagements at their ends in the position they occupy in the mechanism.

FIG. 7 is a view of each part of the set of the coupling nucleus.

FIG. 8 is a detail in section of part of the mechanism.

IV—DETAILED DESCRIPTION OF THE PREFERRED EMBODIMENTS

Figure 2:
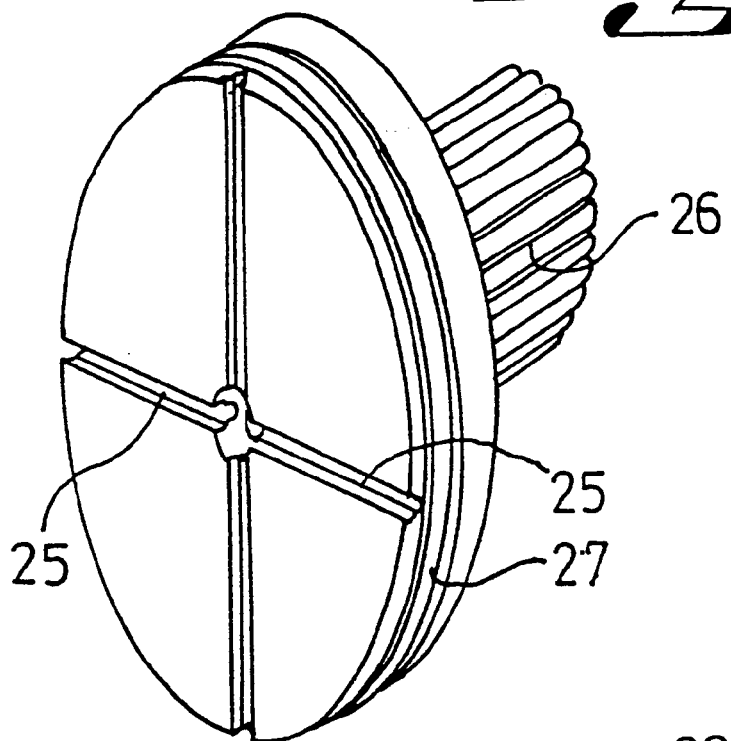
FIG. 2 is a view in perspective of the driving disc.
Figure 3:
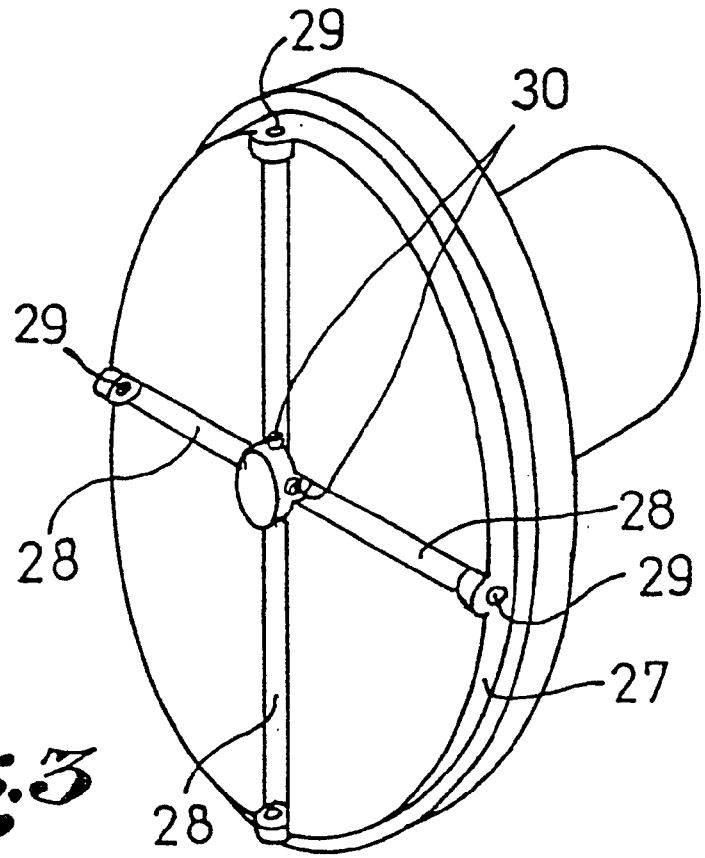
FIG. 3 is a view in perspective of the conducted disc.

As it can be seen in the enclosed figures, FIGS. 1A and 1B show the device applied to the outlets of the differential of a vehicle. The satellites (5) and the planetary (6) respectively connected to the pilot shaft (7), device which has the power outlet (19) that impart the gyratory movement to the traction wheels of the vehicle.

FIG. 1A shows the device connected to the outlet of the differential corresponding to one of the wheels an FIG. 1B shows the same device connected to the outlet of the differential corresponding to another of the mobile wheels.

The outlet (7) is connected to the conductor plate (8) that has radial throats (25) which serve as a guide to the coupling elements (13) that slide on said throats (25).

Simultaneously, the conducted plate (12) also has displacement guides (28) which are opposed to said radial throats (25) and on which another portion of the coupling elements (13) slides.

The coupling element configures a positional variator that shifts radially driven by the rotation of the threaded bars (10) that have on their external ends, conical engagements, the threaded bars (10) being maintained in position by the holes (30) and the slots (29).

Each one of the conical engagements at the end of the threaded bars (10) engages with corresponding doubly serrated rings (9) and (11) of trapezoid section and that have a serration on its peripheric surface and another serration on its oblique side.

The double serrated rings (9) and (11) are the same and are mounted on corresponding steps (27) of the conductor plate (8) and the conducted plate (12).

The serration on the external surface of the rings (9) and (11) are part of a ratchet, its trigger (14) being controlled electro-magnetically by the activators (24).

The radial position of the engaging element (13) is controlled by means of a rheostatic bar (17) of a material which is quite conductive, located at the bottom of the radial throat (25) and the displacement guide (28), on which the electric contact of said coupling element (13) slides.

FIG. 7 shows in detail the construction of the engaging element (13), constituted by a mechanically resistant nucleus (31) on which there is a foil of isolating material (32) so as to separate and isolate it from de conductor foil (33), its ends contacting the rheostatic bar (17). The set is assembled by means of screws (34) made of isolating material.

The connection of the rheostatic bar (17) ith the external part of the mechanism is done through nails of the conductor nucleus (16) covered with isolating material, except the end. Such nails, which are mounted on rings made of isolating material (15) with the heads of the nails, connected to the conductors (20). Said conductors (20), at the same time, are connected to a perimetrical ring (21) made of conductive material. On said perimetral ring (21), the connectors (22) shift, said connectors (22) being connected to the device indicator of the position of the engagements.

Hereinafter, the functioning of the device of the invention shall be described.

The rotation of the cardan shaft of the vehicle, which has a pinion at the end, makes the ring gear (3) of the differential rotate, which, at the same time makes the satellite pinion (5) to rotate which rotates together with the planetary engagement (6). All of which are known as being part of the differential mechanism of a vehicle.

Usually, each one of the planetary engagements (6) is connected to one of the transmission pilot shafts of the vehicle, which also have the end connected to the wheel.

In this case the planetary engagement (6) is connected to the conductor end (7) which, by means of the striated coupling (26), makes the conductor plate (8) rotate, which at the same time moves the conducted plate (12) by means of the couplings (13).

An electronic control system, of the known type, sends the electric signal, which, by means of activating coils (24) activates the trigger (14) of the ratchet mechanism. Depending on which of the ratchets is activated, the corresponding serrated ring (9) which is mounted on the conductor plate (8) ore the serrated ring (11) which is mounted on the conducted plate (12) will be stopped.

Due to the fact that the engagements (3) rotate continuously and drag the differential set, when the ratchet stops one of the serrated rings (9) or (11), the threaded bars (10) will rotate in one or the other direction. And, depending on the direction of such rotation, said couplings (11) will withdraw or draw near in a radial manner, thus varying the lever arm of the rotation axis and therefore of the torque.

As there is a variator device for each pilot shaft, provided with respective control means, a different torque can be applied to each wheel.

Figure 9:
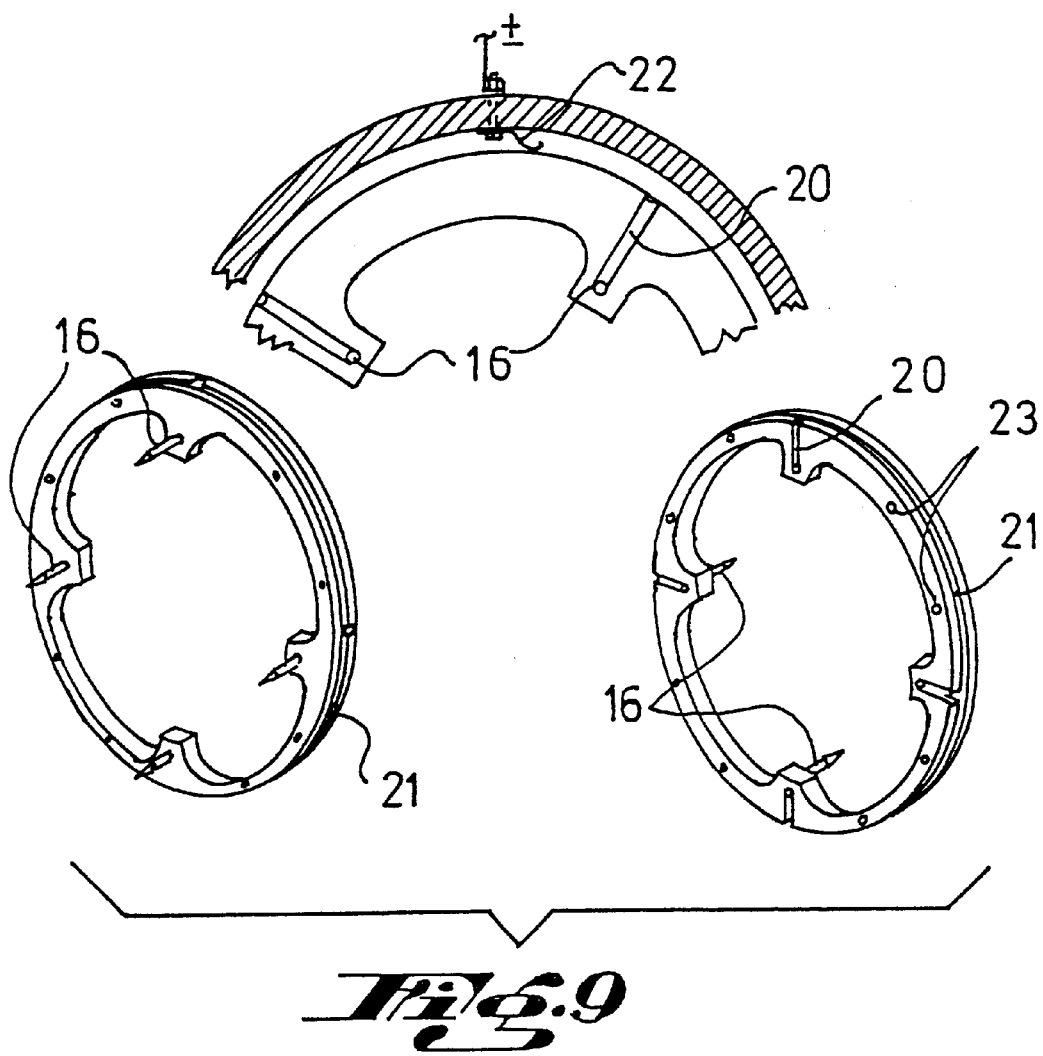
FIG. 9 shows three views of the details of the conductor ring.
Figure 10:
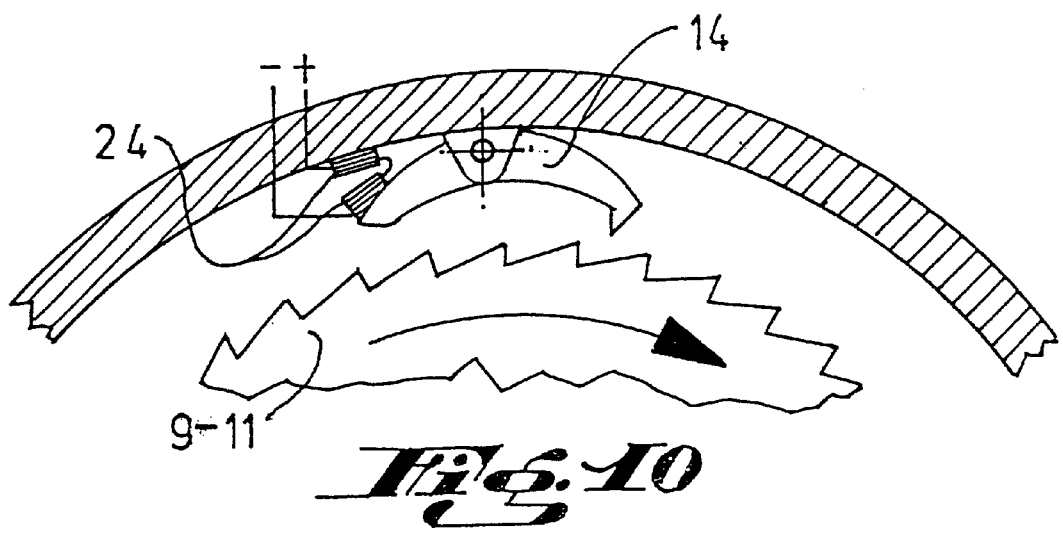
FIG. 10 shows a detail of the ratchet mechanism.

At the same time, the device has a control for the position of each coupling, control that applies voltage to the connectors at the exterior of the carcass (22) [FIG. 9], with which a current is generated. Said current circulates through the peripheric ring (21) made of conductive material, which is mounted on the conductor plate (8), current which, after passing through the lines of conductive material (20) and through the conductive nails (16) goes towards one of the rheostatic bars (17).

As the rheostatic bars (17) are in contact with the conductive sheet (33) in each one of the couplings (13), the location of the latter will be given by the intensity of the circulating current, as the point in which the coupling is located along the rheostatic bar (17) determines the electrical resistance in the circuit and, therefore, the intensity of the current determines the position of the couplings.

What is claimed is:

1. Torque variator device consisting on one mechanism to be interleaved between a conductor transmission arbor and a conducted arbor, characterized because it includes two circular plates each dragging doubly serrated rings that, on one hand constitute the serration of a peripheric ratchet, and, on the other hand engage with corresponding solidary conical pinions at the end of threaded bars located radially and that are gyratory within the radially displaceable coupling elements of said circular plates.

2. The torque variator device consisting on one mechanism to be interleaved between a conductor transmission arbor and a conducted arbor, in accordance with claim 1 wherein it further includes detector means of the location of said coupling displaceable elements.

3. The torque variator device consisting on one mechanism to be interleaved between a conductor transmission arbor and a conducted arbor, in accordance with claim 1 wherein said circular plates are vinculated, one to the conductor arbor and the other to the conducted arbor, said double serrated rings being equal and located in a step in the periphery of said plates.

* * * * *